June 1, 1926.
G. D. DIGGS
SPEEDOMETER DRIVE MECHANISM
Filed Oct. 10, 1924
1,586,976
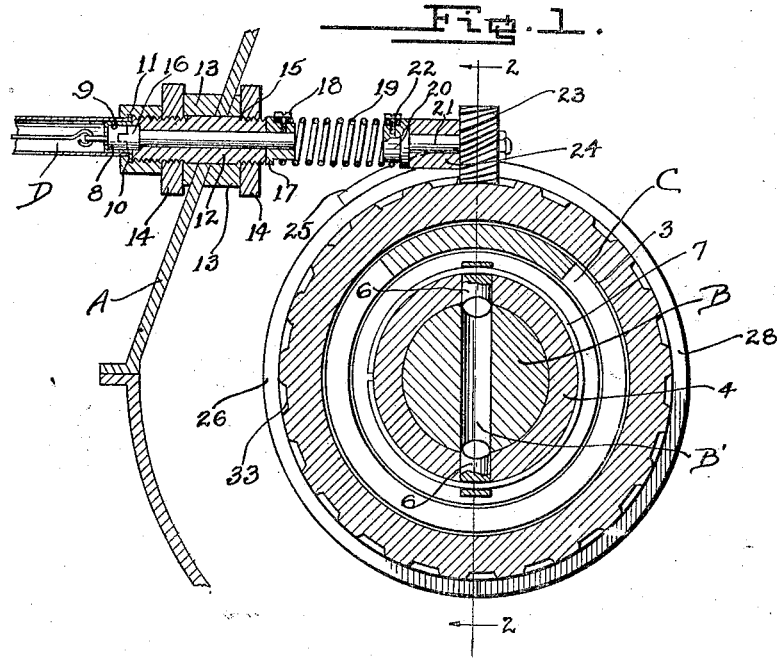
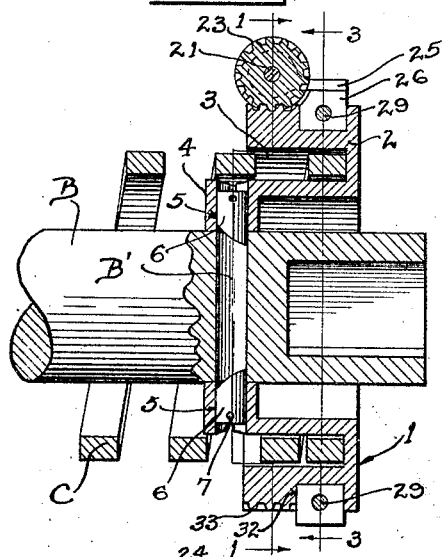
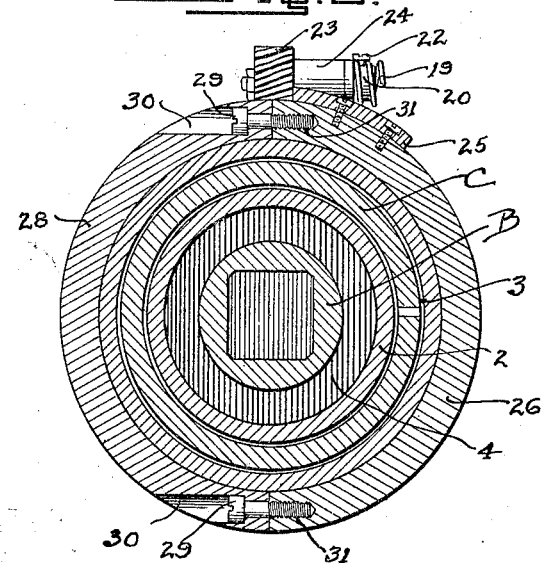
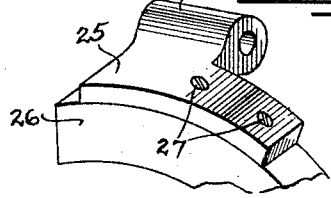
Inventor
George D. Diggs
By Lancaster and Allwine
Attorneys Patented June 1, 1926.

1,586,976

UNITED STATES PATENT OFFICE.

GEORGE D. DIGGS, OF KNOXVILLE, TENNESSEE.

SPEEDOMETER DRIVE MECHANISM.

Application filed October 10, 1924. Serial No. 742,920.

This invention relates to an improved speedometer drive mechanism and one object of the invention is to provide a drive mechanism which may be associated with the clutch spring support carried by the drive plate shaft, of a T model Ford automobile transmission and the speed of the drive shaft thereby directly transmitted to the flexible speedometer shaft.

Another object of the invention is to provide improved means for rotatably mounting a worm gear carrying shaft which will be connected with the flexible speedometer shaft, this shaft mounting means being so formed that it may be mounted about the clutch spring support and prevented from rotating with the spring support.

Another object of the invention is to so construct the mounting for the worm gear shaft that portions forming the same may be easily placed about the spring support and releasably secured together, thereby permitting this mounting to be easily removed when it is necessary to remove the spring support from the drive plate shaft.

Another object of this invention is to provide a spring support so formed that the spring may have engagement with it in the usual manner and the spring support have a portion formed integral therewith and provided with a worm and an annular seat for the mounting of the worm gear shaft.

Another object of the invention is to provide improved means for securing the clutch spring support upon the drive plate shaft and permit the support to be easily put in place and securely held upon the shaft.

Another object of the invention is to provide improved means for connecting the worm gear carrying shaft with the speedometer shaft and compensate for vibration of the motor.

Another object of the invention is to provide improved means for mounting a shaft in the wall of a transmission case with one end portion disposed externally of the crank case for engagement with a speedometer cable and its other end portion within the transmission case for connection with the worm gear carrying shaft.

Other objects and advantages will be brought out in the course of the following description.

One form of this invention is illustrated in the accompanying drawings wherein:—

Figure 1 is a transverse sectional view through a fragment of a T model Ford transmission with the improved speedometer drive mechanism in place, the view being taken along the line 1—1 of Figure 2.

Figure 2 is a sectional view taken along the line 2—2 of Figure 1,

Figure 3 is a transverse sectional view taken along the line 3—3 of Figure 2, and Figure 4 is a fragmentary perspective view showing the bearing for the worm gear shaft.

This improved speedometer drive mechanism is for use in connection with the drive plate of a T model Ford transmission so that the speedometer can be driven from the drive shaft of the engine. Only a fragment of the drive plate has been shown, the transmission casing being indicated by the letter A, the drive plate shaft by the letter B and having the usual transverse opening B' and the clutch spring being indicated by the letter C. The usual clutch spring support has been removed and a spring support forming a part of this invention put in place.

This improved clutch spring support which is indicated in general by the numeral 1 is formed as a unitary structure and will be preferably formed of metal which is machined to provide a body portion 2 having an annular pocket 3 opening through its rear face and receiving the clutch spring C as shown in Figure 2. The rear end portion of this support 1 is provided with a thickened hub portion 4 having openings 5 formed radially therein in opposed relation to each other and adapted to register with the ends of the opening B' of the drive plate shaft B so that latch members 6 which are slidable in these openings 5 may pass into the end portions of the opening B' and secure the spring support upon the drive plate shaft. These latches 6 have their outer end portions provided with transverse openings to receive the spring band 7 which serves to normally retain them in the position shown in Figure 2 and their inner ends are bevelled as shown so that the spring support can be easily slid upon the drive plate shaft and the latches snap into the ends of the opening B'. These latches hold the spring support upon the drive plate shaft with the spring under compression but when it is desired to remove the spring support it is only necessary to first thrust it farther upon the shaft and then turn it a quarter turn upon the shaft and withdraw it from the shaft.

The spring band 7 is seated in a groove formed about the hub 4 so that it will not extend beyond the periphery of the shaft and be liable to be caught and worked loose by the spring C. It will therefore be seen that this device acts very effectively as a clutch spring support.

The speedometer shaft D is of the usual flexible construction and is provided with a socket 8 positioned in a cup 9 having an outstanding flange 10 engaged by a securing cap 11 which is screwed upon the threaded outer end portion of a bearing sleeve 12. This sleeve 12 extends through the wall of the transmission case A and is provided with a threaded inner end portion so that after being passed through the opening provided in the transmission case, bevelled washers 13 may be put in place upon the sleeve and securing nuts 14 then screwed upon the threaded inner and outer end portions of the sleeve to engage with the washers and securely hold the sleeve in place. A shaft 15 is rotatable in this sleeve 12 and has its outer end provided with a head 16 engaging the socket 8 when the cap 11 is screwed upon the sleeve. Upon the inner end of this shaft 15 is placed a collar 17 which is held in place by a set screw 18 and serves to prevent longitudinal sliding of the shaft 15 in the bearing sleeve. The set screw 18 also serves as means for securing one end of a helical spring 19 upon the collar 17. This spring provides a resilient shaft section and has its other end secured upon the head 20 of a shaft 21 by a screw 22. This shaft 21 is rotatably mounted by improved bearing means and carries a worm gear 23 to be rotated from the clutch spring support.

In order to rotatably mount the shaft 21 there has been provided a bearing 24 which is provided with a mounting tongue or bracket member 25 secured to a ring section 26 by screws 27. This ring section 26 together with a second ring section 28 form a complete mounting ring when they are secured together by screws 29 passed through openings 30 in the end portions of the ring section 28 and screwed into sockets 31 in the ends of the section 26. This ring is to be mounted about the clutch spring support and therefore this support has been provided with an annularly disposed groove forming a seat 32 of the proper width and depth to receive the ring as shown in Figure 2 with a portion of the ring extending out of the groove. When the ring is in place the bearing 24 overhangs the rear end portion of the clutch spring support and this rear end portion is cut to form a worm 33 which meshes with the worm gear 23 and rotates the worm gear when the drive plate shaft and clutch spring support are rotating.

When this speedometer drive mechanism is in use it is assembled as shown in the drawings and as the shaft B and clutch spring support rotate rotary movement will be transmitted to the shaft 21 through the medium of the worm 33 and worm gear 23. The ring upon the spring support will be prevented from rotating with the spring support by the spring 19 which in addition to performing this function also serves to transmit rotary movement from the shaft 21 to the shaft 15 and it will be readily seen that the shaft 15 imparts rotary movement to the flexible speedometer shaft. It is important that the spring 19 be made use of as this spring provides a resilient shaft section permitting vibration to take place without the shaft section 15 or its bearing sleeve 12 being damaged. When necessary the ring can be easily removed from the spring support by removing the screws 29.

While the construction specifically shown and described is the preferred embodiment of the invention, other forms of construction may be found practical and the right is therefore reserved to make use of any modifications which come within the scope of the appended claims.

I claim:

1. In a speedometer drive mechanism, the combination of a transmission casing, a drive plate in the transmission casing, a clutch spring support upon the drive plate shaft and turning with the same, and means for transmitting rotary movement from the clutch spring support to a speedometer shaft, including a yieldable shafting journaled at its inner end upon said spring support.

2. In a speedometer drive mechanism, the combination of a transmission casing, a drive plate shaft in the transmission casing, a clutch spring support upon the drive plate shaft and turning with the same, said clutch spring support being provided with an annular flange, for extending over a portion of a clutch spring, shafting journaled at one end in a wall of the transmission casing and extending therethrough into the transmission casing and journaled at its inner end upon the spring support, and cooperating gearing carried by the shafting and flange of the spring support to transmit rotary movement from the spring support to said gearing.

3. In a speedometer drive mechanism, the combination of a transmission casing, a drive plate shaft in the transmission casing, a clutch spring support upon the drive plate shaft and turning with the same, said clutch spring support being provided with an annular flange, for extending over a portion of a clutch spring, shafting journaled in a wall of the transmission casing and extending into the transmission casing, a mounting ring loose upon said flange, a bearing for the inner end portion of said shaft carried by said ring, and a worm gear carried by said shafting and meshing with a worm provided upon said flange.

4. In a speedometer drive mechanism, the combination of a transmission casing, a drive plate shaft in the transmission casing, a clutch spring support upon the drive plate shaft and turning with the same, said clutch spring support being provided with an annular flange provided with a circumferentially extending groove and adjacent the groove cut to provide a worm, a ring mounted in said groove and formed of separable sections, a bearing carried by one section and overhanging said worm, shafting journaled in a wall of the transmission casing and having an inner portion journaled in said bearing, and a worm gear carried by the inner shaft section and meshing with the worm of said clutch spring support.

5. In a speedometer drive mechanism, the combination of a transmission casing, a drive plate shaft in said casing, a clutch spring support upon said drive plate shaft, a bearing loose upon said spring support, shafting adapted for connection with a speedometer shaft and including an outer portion journaled in a wall of the transmission casing, an inner portion journaled in the bearing upon said spring support, and a yieldable portion secured between the inner and outer shaft portions to absorb vibration when the automobile is running, and means for transmitting rotary movement from the clutch spring support to the inner shaft section.

6. In a speedometer drive mechanism, the combination of a transmission casing, a drive plate shaft in said casing, a clutch spring support upon said drive plate shaft, a bearing loose upon said spring support, shafting adapted for connection with a speedometer shaft and including an outer portion journaled in a wall of the transmission casing, an inner portion journaled in the bearing upon said spring support, and having one end provided with a head, a head forming collar secured upon the inner end of the outer shaft section, a helical spring disposed between the inner and outer shaft sections and having its end secured upon said head, and means for transmitting rotary movement from the clutch spring support to the inner shaft section.

7. In a speedometer drive mechanism, the combination of a transmission casing, a drive plate shaft in said casing, a clutch spring support upon said drive plate shaft, shafting for connection with a speedometer shaft including an inner portion rotated from the clutch spring support and an outer section extending through a wall of said transmission casing, a bearing sleeve for the outer shaft section extending through the said transmission casing wall and having threaded end portions, abutment washers upon said sleeve having transmission casing wall engaging ends conforming to the contour of the casing wall, securing nuts upon the threaded end portions of said sleeve and engaging said washers to clamp the washers against the transmission casing wall, and a cap screwed upon the outer end portion of said sleeve for engaging a speedometer shaft and holding the speedometer shaft in operative engagement with the outer shaft section.

GEORGE D. DIGGS.